United States Patent [19]
Doshi et al.

[11] Patent Number: 5,550,848
[45] Date of Patent: Aug. 27, 1996

[54] SIGNALING PROTOCOL FOR A NOISY COMMUNICATIONS CHANNEL

[75] Inventors: Bharat T. Doshi, Holmdel, N.J.; Richard P. Ejzak, Wheaton, Ill.; Sanjiv Nanda, Plainsboro, N.J.

[73] Assignee: Lucent Technologies Inc., Murray Hill, N.J.

[21] Appl. No.: 242,500

[22] Filed: May 13, 1994

[51] Int. Cl.⁶ ............................................. H04L 1/08
[52] U.S. Cl. ............................................................ 371/33
[58] Field of Search ........................................ 371/32, 33

[56] References Cited

U.S. PATENT DOCUMENTS

| | | | |
|---|---|---|---|
| 3,876,979 | 4/1975 | Winn et al. | 340/146.1 |
| 4,439,859 | 3/1984 | Donnan | 371/32 |
| 4,617,657 | 10/1986 | Drynan et al. | 370/60 |
| 4,712,214 | 12/1987 | Meltzer et al. | 371/32 |
| 4,928,096 | 5/1990 | Leonardo et al. | 340/25.44 |
| 4,941,089 | 7/1990 | Fischer | 395/200.01 |
| 4,975,952 | 12/1990 | Mabey et al. | 380/49 |
| 5,036,518 | 7/1991 | Tseung | 371/32 |
| 5,084,877 | 1/1992 | Netravali et al. | 371/32 |
| 5,222,061 | 6/1993 | Doshi et al. | 370/13 |
| 5,291,481 | 3/1994 | Doshi et al. | 370/60 |

*Primary Examiner*—Stephen M. Baker
*Attorney, Agent, or Firm*—Frederick B. Luludis

[57] ABSTRACT

The retransmission of signaling messages that data terminals (e.g., modems) might exchange prior to exchanging user data is controlled by arranging a data terminal that receives multiple copies of the same signaling message so that it saves only the first copy thereof, but transmits a response to the sending terminal following receipt of each such copy. The sending terminal terminates its transmission of the signaling message upon receipt of a response from the receiving terminal. The inventive procedure is especially advantageous for controlling the retransmission of signaling messages during a n-way handshake between two terminals.

5 Claims, 8 Drawing Sheets

SIGNALING PROTOCOL FOR A NOISY COMMUNICATIONS CHANNEL

FIELD OF THE INVENTION

The invention generally relates to communications systems and more particularly relates to a transmission protocol for data terminals.

BACKGROUND OF THE INVENTION

A data link control protocol, such as the well-known HDLC protocol, has been the basis for a large class of signaling protocols including, for example, the X.25 Layer 2, Q.921 and GSM 04.22 protocols covering wired and wireless applications. These protocols typically follow the same procedure that a data terminal invokes to (a) establish a connection or disconnection, (b) negotiate transmission parameters, or (c) exchange operating status information. The procedure typically entails transmitting a signaling message and setting a timer (which is typically set to approximately several times the round-trip transmission delay between the near and far-end) to await receipt of a far-end response to the message. If the transmitted signaling message or transmitted response is lost due to, for example, a noisy connection, then the near-end terminal will not learn of that fact until the associated timer expires. At that point, the near-end terminal may retransmit the lost signaling message and reset the associated timer. The near-end terminal repeats the foregoing procedure if the transmitted message continues to be lost as a result of the noisy connection and does so until it declares an unrecoverable error condition.

It can be appreciated that the foregoing procedure consumes an inordinate amount of time and is not very efficient. This would be true even if the transmitted message reaches the far end after a number of transmission attempts and an acknowledgement response is received at the near end. It is obvious of course that the foregoing may be dealt with to some extent by decreasing the timing period of the associated timer as a way of decreasing the duration between retransmissions and thus the overall delay. However, we have recognized that in the absence of a well-defined set of transmission procedures such a decrease in the value of the timer could place either or both the near-end or far-end terminal (which may be receiving repeatedly a copy of same signaling message) in an ambiguous state.

SUMMARY OF THE INVENTION

We have recognized that the problem that arises as a result of waiting for a timer of a long duration to expire before retransmitting a signaling message that may have been lost may be dealt with by entering a procedure which automatically retransmits an unacknowledged signaling message. Such a redundant retransmission scheme has been priorly used but only after a connection has been established and after the transmission parameters governing the transmission of user data has been negotiated between the near and far-end data terminals. We have also recognized, however, that heretofore such a redundant retransmission procedure has not been suggested as a way of controlling the retransmission of signaling messages that data terminals (e.g., modems) exchange once a transmission connection has been established, but prior to exchanging user data.

As mentioned above, in the absence of well-defined transmission procedures, the redundant retransmission of a signaling message and the recipient's cascaded responses to such messages may possibly lead to placing either one or both of the near and far end data terminals in an ambiguous state. One such state could lead to a potential deadlock between the near- or far-end data terminals. The prior art avoids such ambiguity using a unique sequence number to identify a transmitted message and the order in which the message is transmitted in relation to other transmitted messages. This solution appears to work well for transmitting a long stream of user data messages that need to be kept in order for delivery to an intended destination. However, it is not suitable for exchanging signaling messages between two data terminals during a hand-shake procedure where one terminal has to wait for receipt of a response to a transmitted message before it can transmit a next message.

We avoid the above-mentioned ambiguity without using sequence numbers. Specifically, in accord with an aspect of the invention, a far-end data terminal receiving multiple copies of the same signaling message is adapted so that it saves the first received copy of a message and discards any succeeding copies of the message but repeatedly informs the near-end terminal of the receipt of the first copy of the signaling message. The near-end terminal, in accord with an aspect of the invention, terminates its transmission of the signaling message upon the receipt of the first copy of the response from the far-end terminal. To terminate the procedure in a n-way handshake between two terminals, the initial message and subsequent n-2 messages are respectively transmitted repeatedly by the data terminals while the last message is a hand shake termination message and a copy thereof is sent in response to each copy of response message n-1 that is received from the other terminal. This is done repeatedly responsive to receipt of each such copy of response message n-1 from the other terminal. The other terminal terminates its retransmission of response message n-1 upon receipt of such the hand-shake termination message.

Our invention is particularly advantageous in controlling a three-way, or two-way, handshaking procedure needed for exchanging signaling messages between near and far-end data terminals.

DETAILED DESCRIPTION

Figure 1:
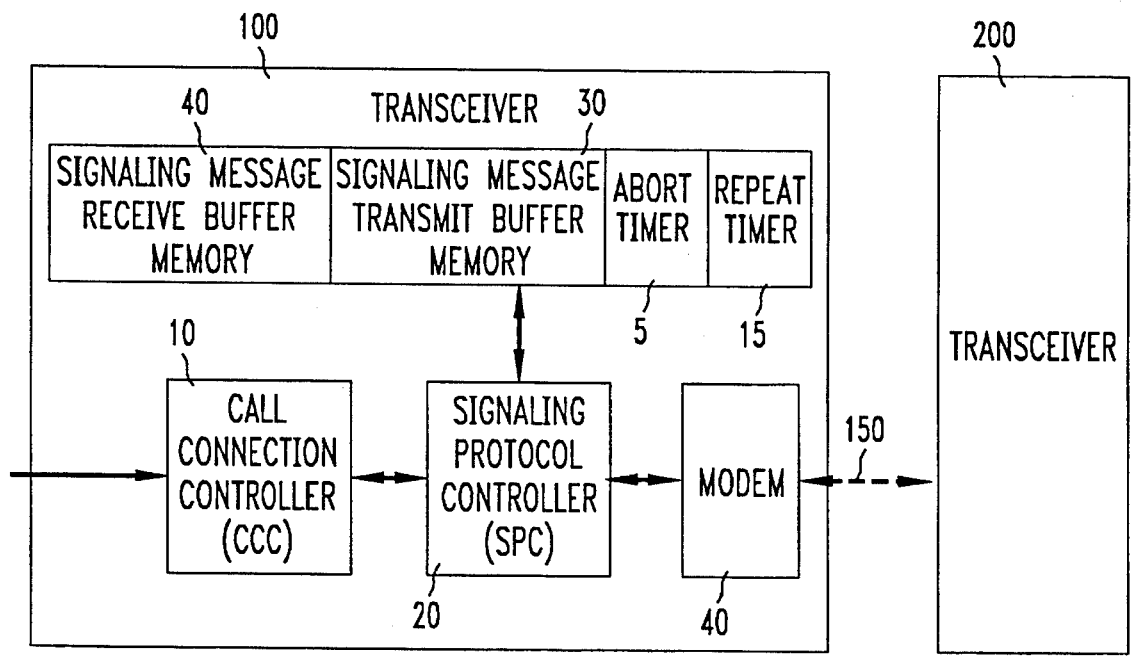
FIG. 1 is a broad block diagram of a data communications system in which the principles of the invention may be practiced.

In an exemplary embodiment of the invention, a transceiver section 100, FIG. 1, of a data terminal operates in accord with a predetermined transmission protocol. Such a protocol may specify a so-called upper layer controller 10 for controlling the processing of a call and associated call connection represented by link 150. Link 150, more particularly, may be a call connection that is established between data terminal 100 and data terminal 200 and may include, in part, a radio link. (It is noted that the operation of transceiver 200 is similar to that of transceiver 100. Thus, any discussion pertaining to transceiver 100 equally pertains to transceiver 200, and vice versa.

Call Connection Controller (CCC) 10 establishes a call connection by communicating with Signaling Protocol Controller (SPC) 20. CCC 10 also controls the connection during the call in the same way. That is, CCC supplies signaling messages to that effect to SPC 20, which then stores the messages in signaling-message-transmit buffer 30. SPC 20 then unloads the messages one at a time and in the order that they were stored in buffer 30 and transmits each unloaded message over connection 150 via a conventional radio link modem 40, all in accord with the inventive protocol.

Since connection 150 may contain a radio link that may be subject to a high error rate (or high loss of data packets), then it is likely that a signaling message that is transmitted over connection 150 may not reach data terminal 200. We deal with that problem, in accord with an aspect of the invention, by repeatedly transmitting a signaling message until either the recipient responds to receipt of the message or a transmission timer expires.

Specifically, when SPC 20 passes a signaling message to modem 40 for transmission over connection 150, SPC 20 then activates an abort timer 5 to set the duration of time over which the signaling message is repeatedly transmitted or until an acknowledgement thereof is received from terminal 200. In an illustrative embodiment of the invention, SPC 20 associates each message that is transmitted with an abort timer 5, which is implemented in memory internal to SPC 20 and which may have a duration of, for example, ten second. If an acknowledgement is received within that period of time, then SPC 20 notifies CCC 10 thereof and cancels timer 5. In accord with an aspect of the invention, the duration between repeated transmissions of the signaling message may be controlled by repeat timer 15, which is activated following the transmission of a signaling message and which may be set for a duration of, for example, one hundred milliseconds. SPC 20 then retransmits the message at the expiration of timer 15 if (a) timer 5 has not expired and (b) an acknowledgement has not yet been received from terminal 200.

A signaling message may be, for example, part of a conventional two-way, three-way or n-way handshake procedure. A three-way handshake procedure is usually invoked during the establishment of a connection and involves the negotiation of operating parameters that control the exchange of user information. (A three-way handshake procedure may also be invoked whenever one or more of the parameters is changed.) A two-way handshake, on the other hand, is typically invoked after a connection has been established to inform the terminal at the other end of the connection of a change in an operating state, for example, when a terminal is not ready or when a terminal refuses to execute a particular request.

Figure 2:
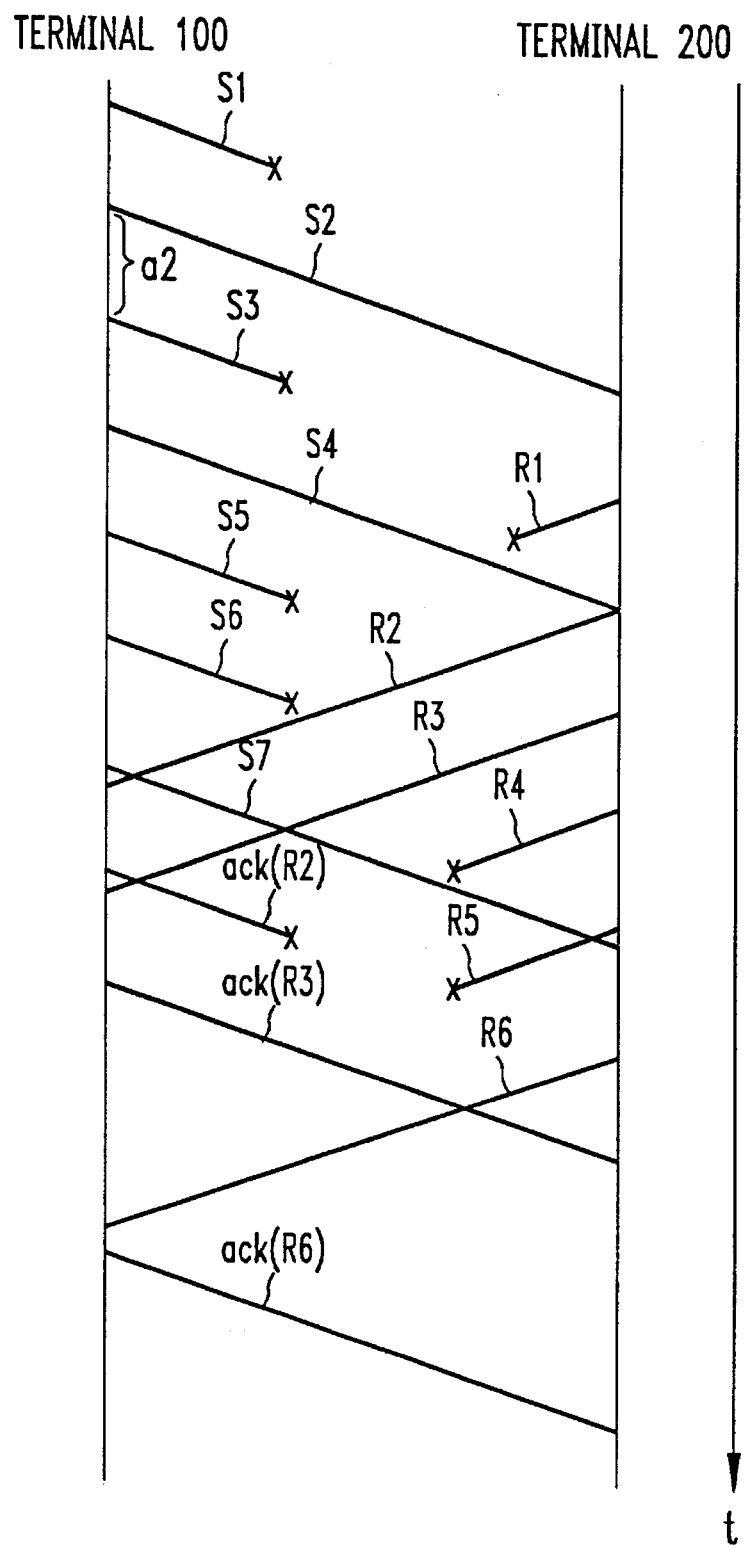
FIGS. 2 and 3 are timing diagrams respectively illustrating the way in which the principles of the invention may be used in a three-way and two-way handshake procedure.

Turning now to FIG. 2, there is shown an example of the way in which the inventive protocol controls the exchange of messages defining a three-way hand shake between data terminals communicating with one another over a noisy link, e.g., a wireless link. The handshake is initiated when terminal 100 transmits signaling message s1. For example, assume that message s1 proposes a particular transmission window size for controlling the exchange of messages between terminals 100 and 200. With that in mind, assume at this point that, as a result of link 150 being noisy, message s1 is lost and does not reach terminal 200. However, in accord with the inventive protocol, terminal 100 automatically repeats the transmission of message s1 for some period of time after the transmission of message s1 and, as mentioned above, will continue to do so until it either receives a response from terminal 200 or the timer 5 associated with message s1 expires. The retransmission starts with message s2 and is repeated thereafter, as represented by messages s3 through s7, which are transmitted every 100 milliseconds, for example, each time repeat timer 15 expires as shown in FIG. 2 by a2. The illustrative example assumes that terminal 200 receives repeated message s2 and passes message s2 to its associated CCC 10. The terminal 200 CCC 10, in turn, generates a response and supplies the response to its associated SPC 20 for transmission to terminal 100 as represented in the FIG. by message r1. Assume that response message r1 is also lost as a result of the noisy link. Similarly, terminal 200, in accord with the inventive protocol, automatically repeats the transmission of message r1 until either it receives an acknowledgement from terminal 100 or the timer 5 associated with message r1 expires. The repeated transmission of message r1 is represented in the FIG. by messages r2 through r6 which are transmitted at a rate determined by duration a2, e.g., every 40 milliseconds.

Assume at this point that signaling messages s3, s5 and s6 are also lost due to the noisy wireless link and that terminal 200 receives messages s4 and s7. Upon receipt of message s4, terminal 200 notes that message s4 is a copy of priorly received message s2, and therefore discards message s4. Terminal 200 processes message s7 similarly.

It is seen from the FIG. that terminal 100 receives response message r2 following the transmission of repeat message s7. The terminal 100 SPC 20, in turn, passes the message to the terminal 100 CCC 10, and stores the message in signaling message buffer 30. In addition, SPC 20 then compares the message r2 with priorly transmitted message s1. In doing so, SPC 20 determines that message r2 is a response to message s1, and, therefore, erases message s1 from buffer 30, thereby terminating the retransmission of that message. In addition, SPC 20 clears the timers 5 and 15 associated with message s1. SPC 20 then transmits message ack(r2) acknowledging receipt of message r2.

In accord with an aspect of the invention, the inventive protocol treats an acknowledgement message, e.g., message ack(r2) different from the way it treats a signaling message, e.g., message s1. Specifically, the transmission of an acknowledgement message is not automatically repeated. Thus, a timer 15 is not associated with a transmitted acknowledgement message. What this means is that an acknowledgement message is transmitted once for each response message and for each copy of such a message that a terminal, e.g., terminal 100, receives. This is shown in the FIG. for message ack(r2) which is lost and not received by terminal 200. Also consider response messages r3 and r6, which terminal 100 (SPC 20) receives and therefore transmits message ack(r3) acknowledging receipt of message r3 and message ack(r6) acknowledging receipt of message r6.

Terminal 200 (SPC 20 thereof), on the other hand, terminates its repeated transmission of the response message (illustrated as r1, r2 . . . r7 in FIG. 2 ) as a result of receiving message ack(r3) after having transmitted message r6. In response to receipt of ack(r3), SPC 20 of terminal 200 (a) passes the ack(r3) message to CCC 10 of terminal 200, (b) clears all timers associated with message r1 and (c) erases message r1 from buffer 30 of terminal 200. Thereafter, SPC 20 of terminal 200 responds to receipt of message ack(r6) by discarding the message since there is no corresponding response message stored in buffer 30 of terminal 200.

As mentioned above, a two-way handshake is used to inform another terminal of a change in an operating state, for example, receiver not ready (which might possibly occur as a result of a buffer overflow, rejection of a request message, or request for a status update and the response thereto). Accordingly, a two-way handshake does not involve a negotiated exchange of parameters. In that case then, a two-way handshake only requires the receiving station to acknowledge receipt of a command message specifying a change in an operating state of the transmitting terminal. What this means is that the receiving station does not have to transmit a response message as would be the case for a three-way handshake.

Figure 3:
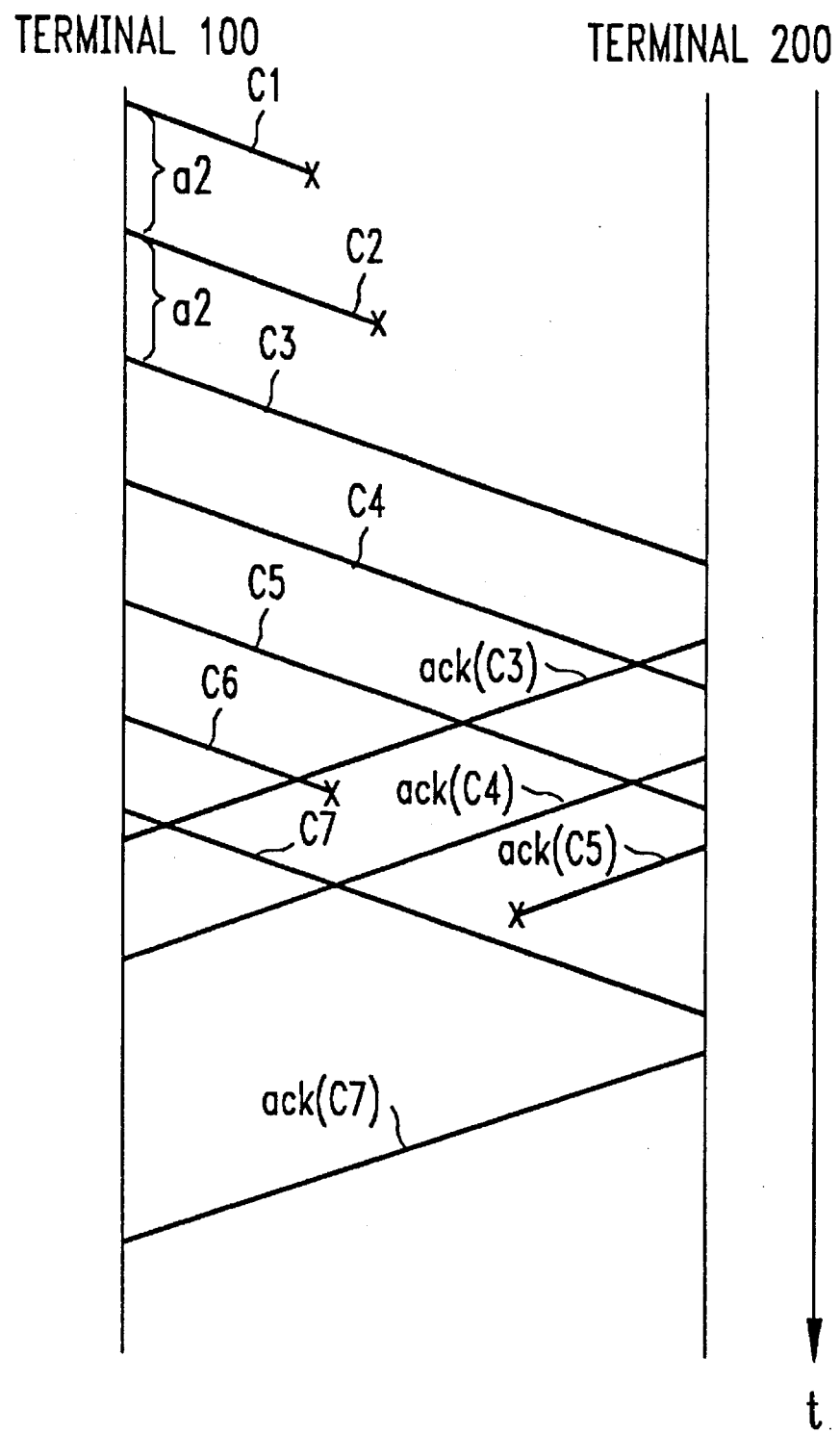

FIG. 3 is an illustrative example of the way in which the inventive protocol controls the transmission of a response to the receipt of a two-way handshake message, c1. It is seen from the FIG. that terminal 100 repeatedly retransmits message c1 until it receives acknowledgement message ack(c3). Similarly, terminal 200 transmits an acknowledgement message responsive to receipt of the command message c1 and each copy thereof, namely messages c3, c4, c5 and c7.

On receipt of message c3, SPC 20 of terminal 200 stores the message in its associated buffer 30 and passes a copy of the message to CCC 10 of terminal 200. When messages c4 and c7 are received subsequently in sequence, SPC 20 discards each of those messages as a result of finding that they are a copy of the c3 message that is already stored in buffer 30. It is seen from the FIG. that as a result of receiving the latter command messages, terminal 200 transmits acknowledgement messages ack(c3), ack(c4), ack(c5) and ack(c7), respectively.

It is noted that upon receipt of message ack(c3), SPC 20 of terminal 100 similarly notifies CCC 10 thereof and then determines if message ack(s2) is a response to message c1. If so, then SPC 20 erases message c1 from buffer 30, thereby terminating the retransmission of that message. In addition, SPC 20 clears the timers 5 and 15 associated with message c1.

Figure 4:
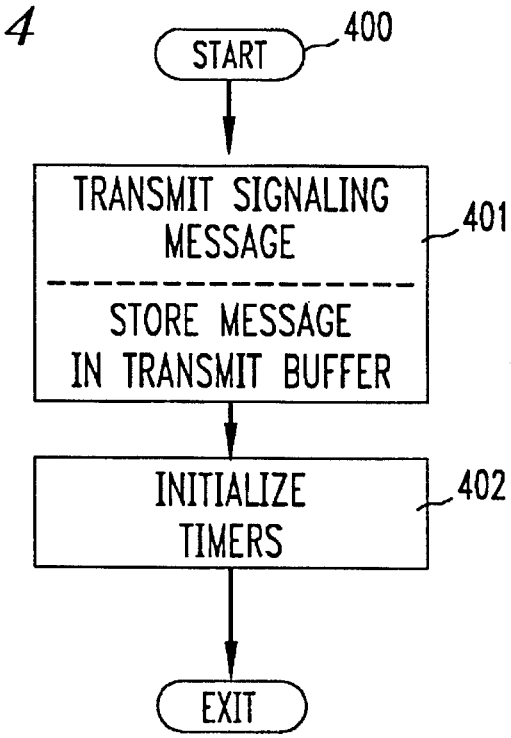
FIGS. 4 through 9 illustrate in flow chart form the programs which implement the principles of the invention in the system of FIG. 1.
Figure 5:
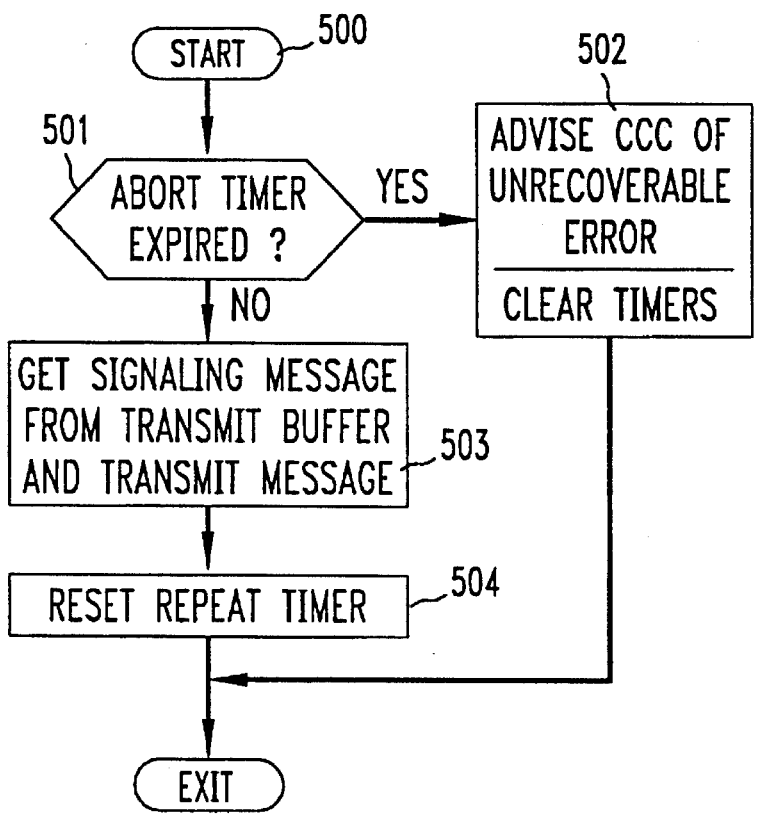

FIG. 4 illustrates the SPC 20 program that is entered responsive to receiving a signaling message from its associated CCC 10 for transmission over the established connection 150. For example, when the CCC of transceiver (terminal) 100 initiates a three-way (two-way) handshake it executes the program illustrated in FIG. 4 to transmit a request (or command in the case of a two-way handshake) message to transceiver 200. The program illustrated in FIG. 5 is entered to provide repeated transmission of a signaling message until a response (or ack in the case of a two-way handshake) is received from the other end of the connection. On receipt of the request (command in the case of a two-way handshake) message, terminal 200 executes the program illustrated in FIG. 6 (FIG. 8 for a two-way handshake) to process the received message. The CCC of terminal 200 then generates a response message which is transmitted to terminal 100 using the program illustrated in FIGS. 4 and 5. When the response arrives at terminal 100, then the program illustrated in FIG. 7 is executed to receive and process the response message. The program illustrated in FIG. 9 is executed at terminal 200 (100 in the case of a two-way handshake) to conclude the handshake procedure between terminals 100 and 200. Specifically at block 401, the program transmits the message and then stores the message in the associated transmit buffer 30. The program then proceeds to blocks 402 and 403 where it associates timers 5 and 15 with the message and then activates those timers. The program then exits at block 404.

FIG. 5 illustrates the program which manages each activated timer 15. Specifically, the program is entered at block 500 periodically ( e.g., every 100 milliseconds when timer 15 expires) and proceeds to block 501 where it checks to see if the associated timer 5 has expired. If so, then the program (block 502) declares an unrecoverable error state, cancels timers 5 and 15 and then exits. If not, then the program (block 503) transmits the associated message. The program (block 504) then resets timer 15 and then exits.

Figure 6:
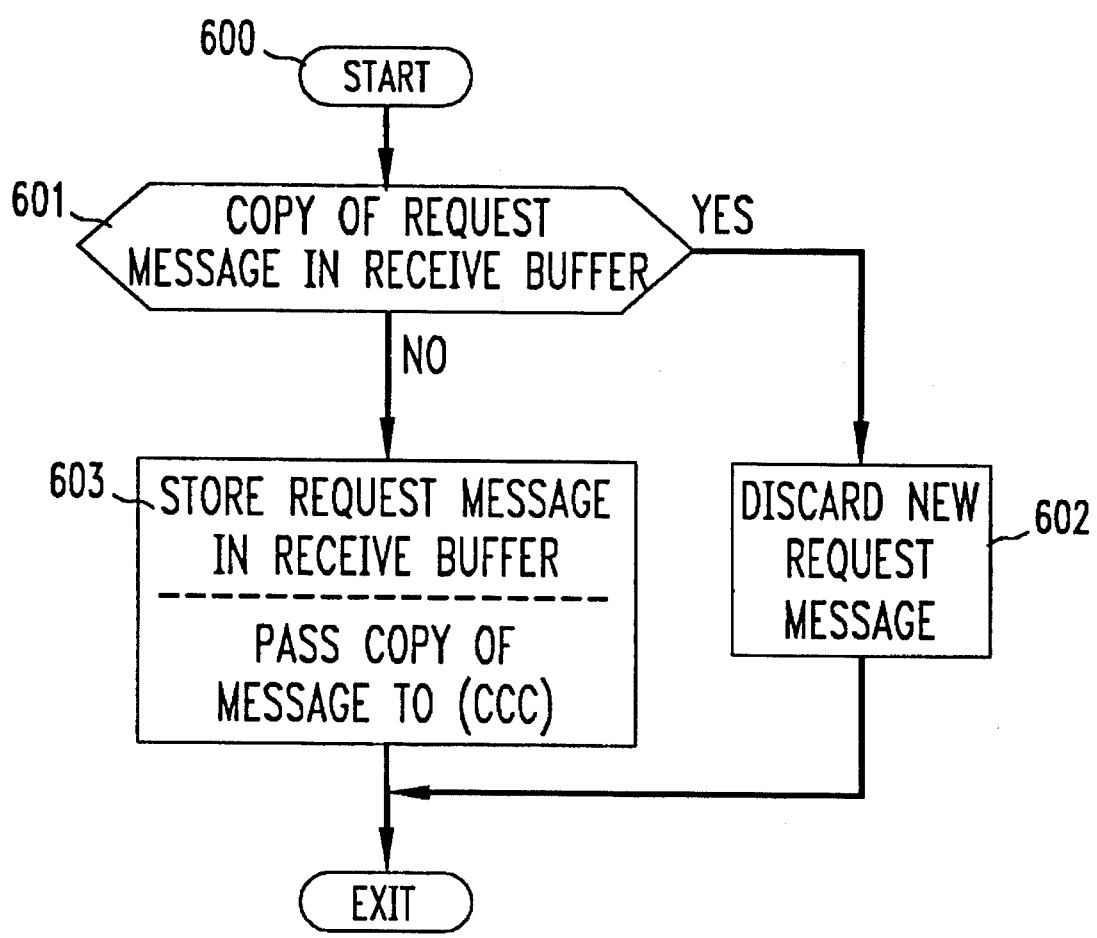
Figure 7:
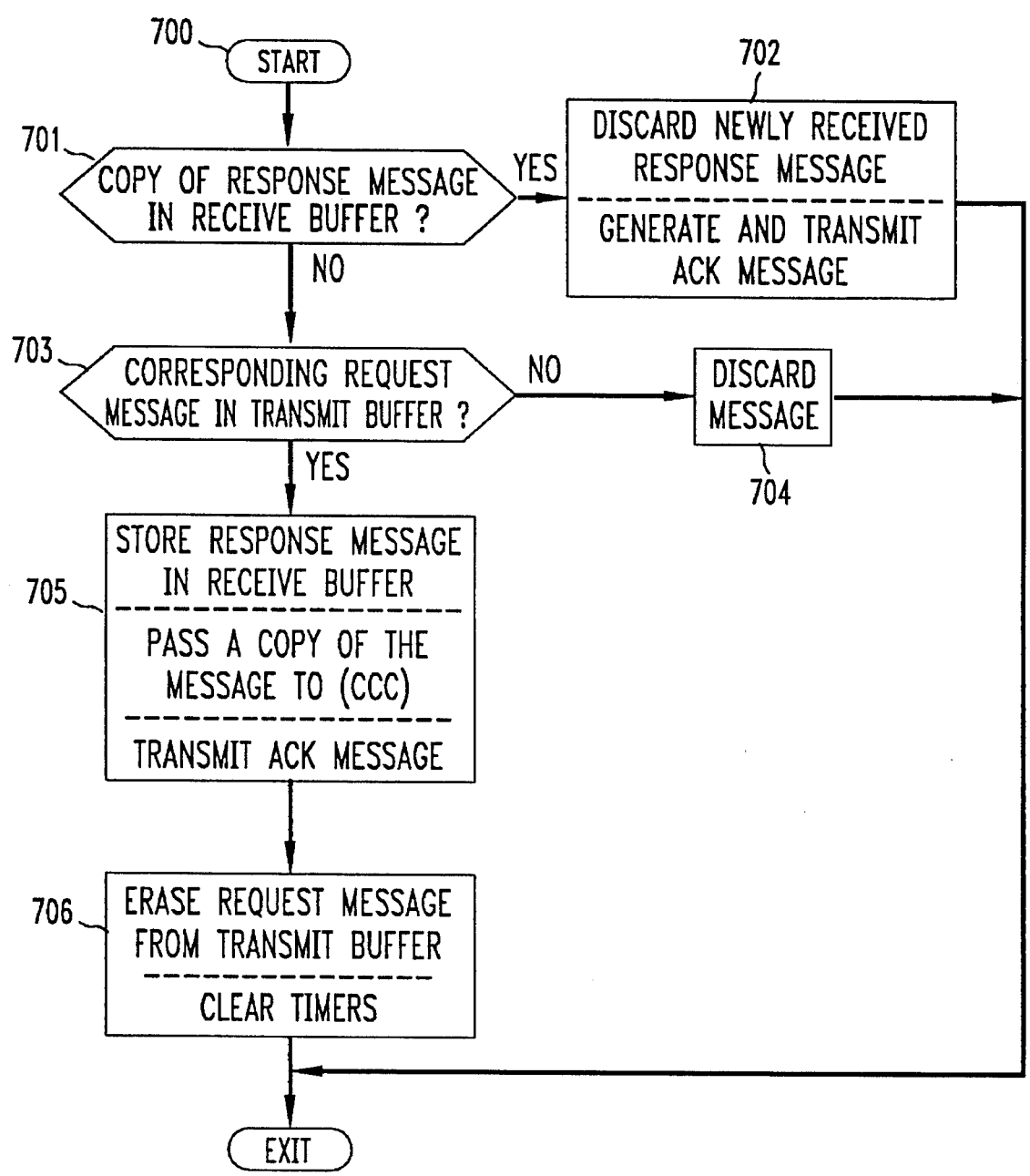

The program of FIG. 6 is entered upon receipt of a request message via the associated modem and established connection and immediately proceeds to block 601 where it checks to see if a copy of the message has already been stored in its associated receive buffer 40. If so, then the program (block 602) discards the message and then exits. If not, then the program (block 603) stores the message in its associated receive buffer 40 and passes a copy of the message to its associated CCC 10. The program then exits.

The program of FIG. 7 is entered at block 700 upon receipt of a response message transmitted by the far-end terminal in response to an earlier request message. When entered, the program proceeds to block 701 where it checks to see if a copy of the message has already been stored in its associated receive buffer 40. If so, the program (block 702) transmits an acknowledgement message (ack) and then discards the received message. The program then exits. If not, the program (block 703) checks to see if the corresponding request message was stored previously in transmit buffer 30. If not, then the program (block 704) discards the received message and then exits. If so, the program (block 705) (a) stores the received message in its associated receive buffer 40, (b) passes a copy of the message to its associated CCC 10 and (c) transmits an ack message acknowledging receipt of the response message. The program (block 706) then erases the corresponding request message from its transmit buffer 30 and clears the associated timers 5 and 15. The program then exits.

Figure 8:
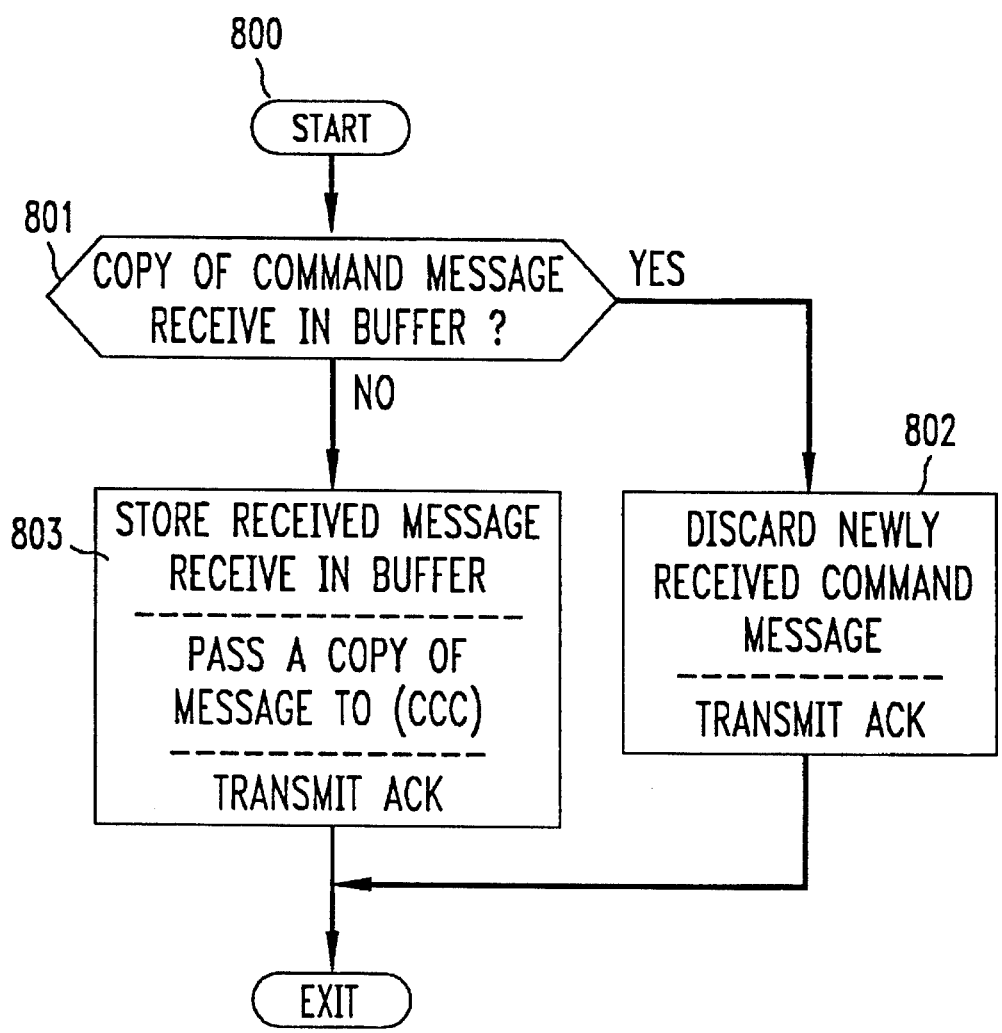
Figure 9:
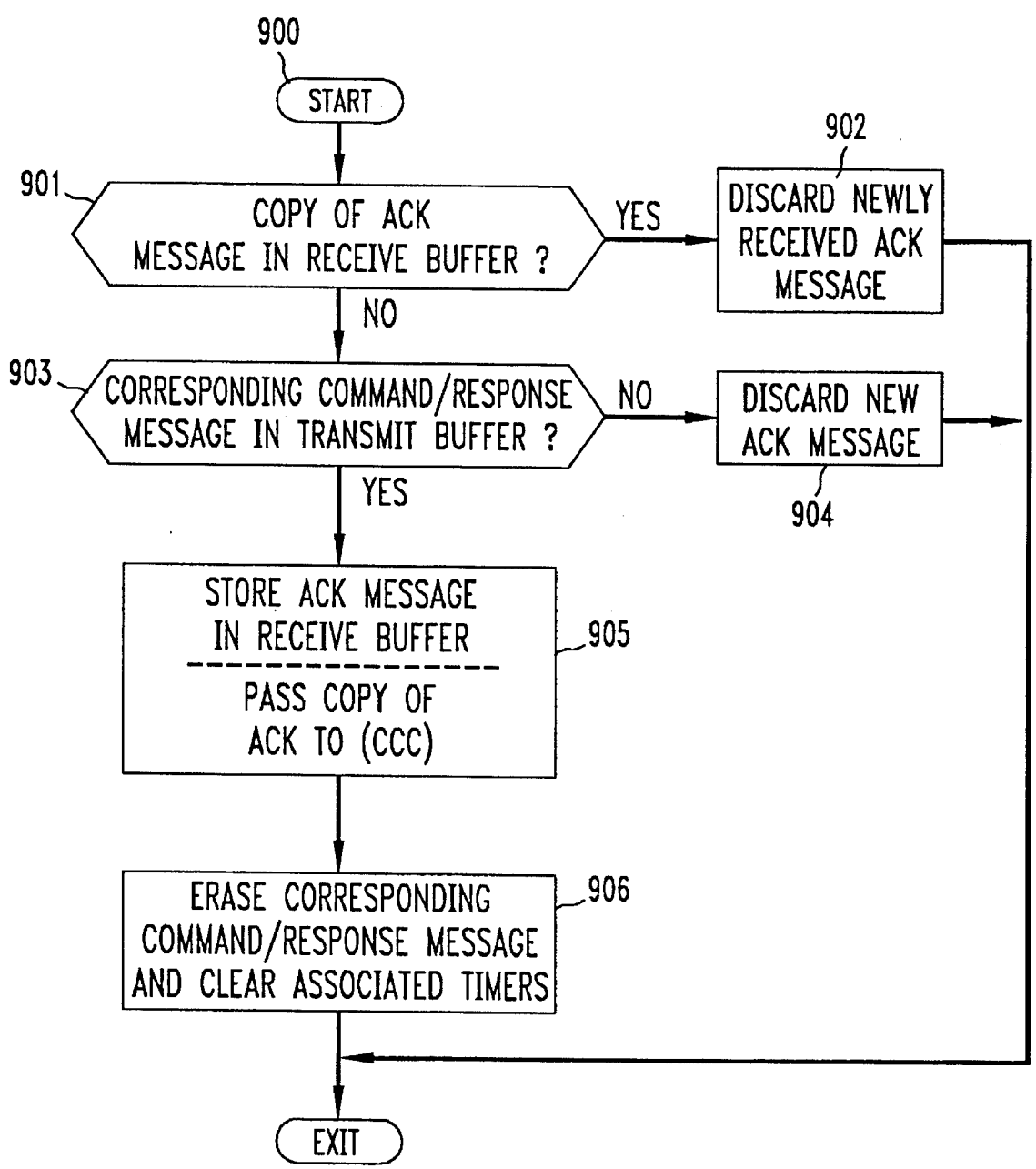

The program of FIG. 8 is entered upon receipt of a command message and proceeds to block 801 where it checks to see if a copy of the command message has already been stored in its associated receive buffer 40. If so, then the program (block 802) transmits an acknowledgement message (ack) and then discards the received message. The program then exits. If not, then the program (block 803) (a) stores the received message in its associated receive buffer 40, (b) passes a copy of the message to its associated CCC 10 and (c) then transmits an ack message acknowledging receipt of the command message. The program then exits.

The program of FIG. 9 is entered upon receipt of an acknowledgement (ack) message to an earlier response or command message. When so entered, the program proceeds to block 901 where it checks to see if a copy of the ack message has already been stored in its associated receive buffer 40. If so, then the program (block 902) discards the received ack message. The program then exits. If not, the program (block 903) checks to see if the corresponding response or command message was stored previously in transmit buffer 30. If not, then the program (block 904) discards the received ack message and then exits. If so, the program (block 905) (a) stores the received message in its associated receive buffer 40, and (b) passes a copy of the ack message to its associated CCC 10.

The foregoing is merely illustrative of the principles of the invention. Those skilled in the art will be able to devise numerous arrangements, which, although not explicitly shown or described herein, nevertheless embody those principles that are within the spirit and scope of the invention. For example, since a signaling procedure may be initiated at either the near- or far-end transceiver (e.g., terminal 100 or 200), then there is a chance that multiple independent procedures may be active simultaneously. Also, different method sequences should be uniquely identified so that a response may be associated with a particular request.

Further, if two transceivers initiate signaling procedures of different levels of priority, then the procedure having the higher level of priority may cause the lower priority procedure to abort. This case might occur when, for example, a CCC responds to a request by transmitting a high priority request, rather than a response to the received request.

Still further, if two transceivers simultaneously initiate procedures of equal priority, then a contention resolution scheme may be invoked to deal therewith. Such a contention resolution scheme may include the claimed invention. For example, if the two terminals determine between themselves which has the higher priority by using their respective serial numbers or some other attribute, then the lower priority terminal may abort its procedure. As another example, if a transceiver (terminal) receives from another transceiver a request having a priority equal to that of a request that it just transmitted, then the receiving transceiver enters a state indicative of receiving a valid response to its transmitted request.

We claim:

1. Apparatus to control the exchange of signaling messages between first and second data terminals, individual ones of the signaling messages requiring a response from the receiving terminal, said apparatus comprising at the first data terminal, means, responsive to the input of a signaling message requiring a response message, for repeatedly transmitting the signaling message and repeating such transmission until said response message is received from a second receiving terminal, at the second data terminal, means, responsive to receipt of the signaling message, for repeatedly transmitting the response message until a confirmation message is received from the first data terminal, and at the first data terminal, means for transmitting said confirmation message responsive to receipt of each response message.

2. Apparatus to control the exchange of signaling messages between data terminals, individual ones of the signaling messages requiring a response from a receiving terminal and other ones of the signaling messages requiring a confirmation from the receiving terminal, said apparatus comprising means, operative at one of the data terminals and responsive to receipt of a signaling message from the other one of the data terminals, for repeating the transmission of the response until a confirmation message is received from the other one of the data terminals, and means, operative at the other one of the data terminals, for transmitting a confirmation message responsive to receipt of each said response message.

3. A method of controlling a hand-shake procedure between first and second communications terminals, said method comprising the steps of at the first communications terminal, transmitting an initial hand-shake message to the second communications terminal and repeating the transmission of the initial hand-shake message until a message responding to the initial hand-shake message is received from the second communications terminal, and transmitting a confirmation message responsive to receipt of each such responding message, and at the second communications terminal, transmitting a response message responsive to receipt of each initial hand-shake message and terminating such transmission upon receipt of said confirmation message.

4. A method of controlling a hand-shake procedure between first and second communications terminals comprising the steps of at the first communications terminal, repeatedly transmitting a signaling message to the second communications terminal until a message confirming receipt of the signaling message is received from the second communications terminal, said repeated transmission of said signaling message being independent of an expiration of a timer function associated with waiting for an acknowledgment from said second communications terminal, and responsive to receipt of each signaling message at the second communications terminal, transmitting the confirmation message.

5. A method of controlling the exchange of signaling messages between first and second data terminals, individual ones of the signaling messages requiring a response from the receiving terminal, said method comprising the steps of at the first data terminal, responsive to the input of a signaling message requiring a response message, transmitting the signaling message to said second terminal, said signaling message being associated with a predetermined level of priority, and at said first terminal, responsive to receipt of a signaling message associated with said predetermined level of priority from said second terminal prior to receipt of a valid response to said transmitted signaling message, entering a state indicative of receiving a valid response to said transmitted signaling message.

* * * * *